(12) United States Patent
George (10) Patent No.: US 8,771,414 B2
(45) Date of Patent: Jul. 8, 2014

(54) FOAMING AGENT

(75) Inventor: Anthony S. M. George, Cannon Park (GB)

(73) Assignee: Genesis Global Limited, Apia (WS)

( * ) Notice: Subject to any disclaimer, the term of this patent is extended or adjusted under 35 U.S.C. 154(b) by 144 days.

(21) Appl. No.: 13/142,648

(22) PCT Filed: Dec. 30, 2009

(86) PCT No.: PCT/GB2009/002975
§ 371 (c)(1),
(2), (4) Date: Aug. 17, 2011

(87) PCT Pub. No.: WO2010/076565
PCT Pub. Date: Jul. 8, 2010

(65) Prior Publication Data
US 2011/0297048 A1   Dec. 8, 2011

(30) Foreign Application Priority Data

Dec. 31, 2008   (GB) .................................. 0823721.6

(51) Int. Cl.
*C04B 24/00*   (2006.01)

(52) U.S. Cl.
USPC ........................................................ 106/724

(58) Field of Classification Search
USPC ........................................................ 106/724
See application file for complete search history.

(56) References Cited

U.S. PATENT DOCUMENTS

| 3,522,069 A | 7/1970 | Checko et al. |
| 4,049,465 A | 9/1977 | Dwyer |
| 4,373,955 A | 2/1983 | Bouchard et al. |

FOREIGN PATENT DOCUMENTS

| BE | 1016630 A3 | 3/2007 |
| GB | 1387500 A | 3/1975 |
| GB | 2251857 A | 7/1992 |
| GB | 2330086 A | 12/1997 |
| RU | 2145586 C1 | 2/2000 |

*Primary Examiner* — Paul Marcantoni
(74) *Attorney, Agent, or Firm* — Maginot, Moore & Beck, LLP (57) ABSTRACT

A foaming agent solution, cement material and concrete replacement product are described which include blood hydrolysates. The blood hydrolysates may be present in the foaming agent solution in the range 5-30% by volume of the solution.

10 Claims, 5 Drawing Sheets

Graph Illustrating the Relationship between Density and the Flow Rate of Foaming Agent (Triangle) and Foaming Agent Solution (Square) at a mixing speed of 10.04 Kgs/minute

Figure 1

Graph Illustrating the Relationship between Density and the Flow Rate of Foaming Agent (Triangle) and Foaming Agent Solution (Square) at a mixing speed of 10.04 Kgs/minute

Figure 2

Graph Illustrating the Relationship between Density and the Flow Rate of Foamed Foaming Agent Solution at a mixing speed of 10.04 Kgs/minute

Figure 3

Graph Illustrating the Relationship between Density and the Flow Rate of Water at a mixing speed of 10.04 Kgs/minute

FOAMING AGENT

PRIORITY

This application is a U.S. National Stage Application of International Patent Application PCT/GB2009/002975, titled Foaming Agent, filed 30 Dec. 2009, which claims priority to Great Britain Application 0823721.6, filed 31 Dec. 2008, each incorporated herein by reference.

FIELD

The invention relates to a foaming agent, in particular to a protein containing foaming agent, and to the inclusion of this foaming agent in foaming agent solutions, cement materials and replacements for concretes. The invention further relates to processes for preparing this group of products.

BACKGROUND

Cements and concretes have been used by man for millennia; however, as society continues to evolve, so do the needs of the construction industry. As part of this evolution new construction materials are constantly being developed.

United Kingdom Patent No. GB 2 330 086 relates to a mixing apparatus which provides a foamed concrete; foamed concretes and cements are useful in applications where lightweight materials are desired, and/or where good thermal insulating properties may be useful, such as in housing insulation applications.

GB 2 330 086 describes the use of a protein based foaming agent to provide a stable foam. Similarly, The use of proteins in cements is described in U.S. Pat. No. 4,049,465 which relates to stucco cement containing an animal or vegetable protein (such as animal glue or gelatin), the protein in U.S. Pat. No. 4,049,465 is not a foaming agent. U.S. Pat. No. 3,522,069 describes a magnesia cement containing hydrolysed protein for use as a fire retardant; and U.S. Pat. No. 4,373,955 describes an insulating material with a low compressive strength, the material contains hydrolysed protein; pumice and pulping waste sulfite liquor as part of the mixture. The hydrolysed protein of U.S. Pat. No. 4,373,955 is not a foaming agent.

However, there remains a need in the art for a foaming agent which can be used to provide a cement or concrete replacement product which offers an improvement in one or more aspects of the concrete products known in the art. In particular, the foaming agent of the invention (optionally in the form of a foaming solution) can be used to provide a replacement of concrete using cement material which can independently be of lower density, high strength, uniform structure, lower cost when compared to concrete products, and yet offer normal curing.

SUMMARY

According to a first aspect of the invention there is therefore provided a foaming agent comprising a blood hydrolysate. Additionally or alternatively there is provided a foaming agent obtainable by reaction of a protein with a base.

The presence of a blood hydrolysate has been found to provide a substantially stable uniform foam which in turn results in cement materials and concrete replacements which begin curing before the foam breaks down. Similarly, proteins which are treated with a base have been found to offer the same foam stability. Proteins, in particular where blood is used as the protein source, offer an environmentally friendly and inexpensive source of materials. This is because these materials are often waste materials which would otherwise require disposal and may leach into the environment. For instance, slaughter houses must dispose of hundreds of thousands of gallons of blood every year, the inclusion of blood from this source into building materials would reduce operating costs for the slaughterhouse owners as they would no longer have to dispose of the blood, and would offer an effectively free source of protein to the construction industry for incorporation into the building materials of the invention.

As the foaming agent of the invention ensures that curing (and hence setting of the cement material) can begin prior to foam breakdown the resulting cementious material or concrete replacement product is of uniform structure. This uniformity of structure provides for a product with fewer weak points than known concretes. Further, as the air remains trapped within the foam, the cement materials into which the foaming agent is incorporated are generally less dense than known concretes and foamed concretes. Although the cement materials and concrete replacement products of the invention are of lower densities, they are surprisingly strong. This strength arises from the presence of a network of hardening cement material walls around the bubbles of air in the final cement material or concrete replacement product. Without being bound by theory, it is believed that it is the presence of multiple small bubbles which provide the remarkably strong conformation.

In a second aspect of the invention there is provided a foaming agent solution comprising a blood hydrolysate and a solvent. Additionally or alternatively there is provided a foaming agent solution comprising a protein foaming agent obtainable by reaction of the protein with base, and a solvent.

The inclusion of the foaming agent (i.e. the blood hydrolysate or protein foaming agent obtainable by reaction of the protein with base) in a foaming agent solution improves the physical properties of the foaming agent in the sense that the viscosity of the foaming agent is reduced making the foaming agent easier to manipulate when in a solution. For instance, the foaming agent solution is easier to mix with the materials to be foamed than the undiluted foaming agent, and the foaming agent solution is easier to foam and to pump through any necessary machinery than the undiluted foaming agent. As such, a foaming agent solution will often be formed prior to use of the foaming agent.

A third aspect of the invention provides a cement material comprising a blood hydrolysate; additionally or alternatively the cement material may comprise a foaming agent obtainable by reaction of a protein with a base.

Although the blood hydrolysate or base reacted protein will generally be introduced into the cement material as part of a foaming agent, this is not essential. The cement materials of the invention have been found to be strong materials with good thermal insulation properties and lower densities than known cement based materials and products. Further, they have been found to have a high strength even in the absence of steel reinforcement and heavy aggregates. The strengths of the cement materials of the invention are similar to those of ready-mix concrete; however, concrete derives much of its strength from the presence of heavy aggregates which are not essential to the cement materials of the invention. Further, the cement materials of the invention are lighter than ready mix concrete, not only because of the air network described above but also as they do not include heavy aggregates which are an intrinsically high mass component of known cement products. The strength-to-weight ratio of the inventive cement materials may be greater than concrete by an average of 21.7%, with the average weight being 45% less than concrete.

Hence, the cement material of the invention may be used directly in building applications without the addition of heavy aggregates to form a concrete product.

In a fourth aspect of the invention there is provided a concrete replacement comprising a blood hydrolysate. The blood hydrolysate may form part of the cement material, foaming agent or be added directly to the concrete replacement. However, typically the blood hydrolysate will be the foaming agent.

The cement materials and concrete replacements of the invention set surprisingly quickly and can be used within 3 days. The maximum strength of normal concrete is reached in approximately 28 days. The invention can equal concrete strengths in 56 days due to the much higher volume of mixing water used but can continue curing and gaining strength thereafter, again due to the much higher volume of mixing water used. This offers clear benefits in terms of cost and time savings to the builder using a cement material or concrete replacement in accordance with the invention. Further, the concrete replacement need not include rubble or other heavy aggregates which are typically used to impart strength to normal concrete. Instead, sand or other fine particulates are sufficient as the air network described above imparts strength to the concrete replacement product of the invention.

A fifth aspect of the invention provides a process for preparing a foaming agent comprising the steps of:
  reacting a protein with a base to form a mixture; and
  adding an acid to the mixture.

And a sixth aspect of the invention provides a process for preparing a cement material comprising the steps of:
  combining a foaming agent with a solvent to provide a foaming agent solution, wherein the foaming agent is obtainable by reaction of a protein with a base and/or wherein the foaming agent is a blood hydrolysate;
  foaming the foaming agent solution;
  adding the foamed foaming agent solution to a solid material with mixing.

Further aspects of the invention include a cement material comprising pores of size in the range 500-1500 μm and pores of size in the range 25-250 μm and a process for preparing a concrete replacement comprising the step of including a granular material in the solid material according to the sixth aspect of the invention; and foaming agents and cement materials prepared using the processes of the fifth and sixth aspects of the invention respectively.

As noted above, generally the protein will be the foaming agent, this may be a blood hydrolysate or a foaming agent obtainable by reaction of a protein with a base. The foaming agent may comprise these materials or consist either entirely or essentially of a blood hydrolysate, a product obtainable by reaction of a protein with a base or a combination thereof.

The protein may be animal or vegetable based and will typically be selected from, soy protein, collagen, blood or a combination thereof. Where the protein is blood it will typically be ox blood, sheep's blood, poultry blood or combinations thereof; however, ox blood is often used due to the high levels of protein present in ox blood. Where sheep's or poultry blood are used these may be processed to increase the percentage of protein therein. Where the protein is blood, the foaming agent is the blood hydrolysate of the invention.

It will often be the case that the animal slaughtered will be of age less than 18 months, this reduces the risk that the animal has become diseased and hence that the blood sourced from this creature contains a source of human infection. However, as the blood is subsequently processed using sanitising if not sterilising conditions (typically at least one of high temperature, pressure and extremes of pH), any pathogens present in the blood prior to treatment will typically be eliminated. As a result, the blood hydrolysate of the invention is substantially free of pathogens and hence safe to use. For this reason, the animals may be of age greater than 18 months.

As used herein the term "blood hydrolysate" is intended to mean any blood derivative in which the proteins contained therein are at least partially broken down into polypeptide chains and/or amino acids, for instance by reaction with base, acid or enzymic digestion. It will generally be the case that the blood hydrolysate of the invention will result from reaction of blood with base; it will also generally be the case that the protein reacted with base is blood or an extract from blood.

When used in a foaming agent solution, the blood hydrolysate, or product of the reaction of the protein with base, may be combined with a solvent. Combination may be simple mixing and this may occur prior to use allowing the provision of a "ready-made" foaming agent solution. Alternatively, the combination of the foaming agent and solvent may be at the point of use, for instance, by mixing in a foaming apparatus. A wide range of solvents may be used, of these, polar solvents will be used most regularly and water is generally preferred. Where water is used as the solvent, it may be the only solvent or it may be used in combination with one or more additional solvents. Where water is used in combination with another solvent it will typically be the primary solvent (by which is meant the solvent present in the largest % by volume). Often, where one or more secondary solvents are present (i.e. solvents present in a % by volume lower than the amount of water present), these will be present in minor amounts, for instance in the range 0-10% by volume of the solvent for the total amount of secondary solvent; often in the range 0-5% by volume, often 0-1% by volume. The water need not be in a high state of purity, mains water will typically be used.

The cement material may be any known cement including, for instance, Portland cement, Portland cement blends such as Portland Pozzolian cement, and non-Portland cements including lime cements and super-sulfated cements. In general, Portland cement will be used, in particular "pure" Portland cement, by which is meant a commercially available Portland cement without any additives (for instance a Portland cement where no fly ash has been added).

It is generally the case that the foaming agent will comprise the base treated protein or blood hydrolysate. However, it is specifically envisaged that the base treated protein or blood hydrolysate be an additive in addition to a secondary foaming agent which may be present either in the cement material, or the concrete replacement. A secondary foaming agent could be a surfactant compound for instance.

As used herein the term "cement" is intended to mean a powdered material which, when combined with water hardens. The term "concrete" is intended to mean a hard material comprising water, sand, cement and heavy aggregate including pulverised fuel ash or fly as or slag. The term "concrete replacement" is intended to mean a hard material comprising water, cement material and a granular material. The term "granular material" is intended to include fine aggregates such as sand, but to exclude heavier aggregates such as pebbles, gravel, pebbles, crushed stone, slag etc. The granular materials of the invention are intended to have maximum granular cross-sections of 2 mm, often the granular materials of the invention will have granular cross-sections in the range 62.5 μm-2 mm. The concrete replacement material of the invention may include a wide variety of materials which would otherwise be "waste materials" and require disposal. For instance, the concrete replacement product may include pulverised fuel ash, fly ash, stone dust, marble dust, waste from sugar refineries, china clay, or other waste materials compatible with cement or lime. Such materials may replace in the range 0-30 wt % of the cement or sand content of the cement material or concrete replacement product of the invention, often 5-25 wt %, on occasion 10-20 wt %.

Accelerators and pigments may be present but are not required. Often the cement materials and concrete replacement products of the invention will not include accelerators and/or pigments.

The concrete replacement of the invention will typically comprise water in the range 10-40 wt %, often in the range 25-40 wt %; typically in the range 32-37 wt %. 35 wt % is regarded as the optimal level of water as at this level the replacement concrete sets efficiently and with a high level of strength.

Known concretes typically include water at a level of about 5 wt %, a significantly lower level than the concrete replacement products and applications of the invention. The use of a greater amount of water reduces the costs of the inventive product as water is less expensive than aggregate and cement. What is surprising is that the concrete replacements of the invention set, prior art concretes and cements would separate and fail to harden in the presence of such high levels of water. However, not only does the inventive concrete replacement or cement set, it sets quickly to form a strong product. Further, this product may be cut to shape without breaking or disintegration of the edges produced. This results in a product which may be used for a huge range of applications in which unusual shapes may be required.

The concrete replacement or cement material of the invention typically includes pores of mean diameter in the range 10-250 μm, sometimes in the range 25-125 μm, often 35-125 μm, these may be referred to as micropores. The concrete replacement or cement material of the invention may also include air cells which are larger, macropores. The macropores will typically have a mean diameter in the range 500-1500 μm, sometimes in the range 600-1000 μm.

In most examples, the pores (micropores and macropores) are substantially evenly distributed within the concrete replacement or cement material; as a result the concrete replacement or cement material is substantially homogenous in the sense that any sample taken of the concrete replacement will be representative of the whole. This even distribution may be substantially random.

Typical density ranges for the concrete replacement or cement material of the invention are in the range 400-2000, or 2100 $Kg/M^3$ and typical compressive strengths in the range 4-53 $N/mm^2$. The density may be in the range 450-1500 $Kg/M^3$, in some examples in the range 450-1000 $Kg/M^3$, on occasion it may be desirable to prepare a concrete replacement or cement material with density in the range 450-600 $Kg/M^3$. The compressive strength may be in the range 20-53 $N/mm^2$, or 20-32 $N/mm^2$, often 25-30 $N/mm^2$. Strengths of this magnitude allow the inventive concrete replacements to be used in load bearing applications, the known foamed concretes which the inventive products are intended to replace have significantly lower compressive strengths, typically of the order 6 $N/mm^2$ or less and are not suitable for use in load bearing applications. Instead, known foamed concretes are generally used as "infill" concretes.

Indeed, it is generally well known in the cement industry that the inclusion of voids in concrete is undesirable. For instance, the General Concreting Brochure produced by Lafarge states that voids lower the performance of concrete and lead to a reduced strength, increased permeability and reduced durability. The inventive concrete replacement product does not have these disadvantages despite the purposeful inclusion of voids within the product.

It is important to note that the stability of the foam produced using the foaming agents of the invention provides a product which is of consistent density throughout. This differs from known foamed concretes in which the foam typically breaks down before the setting of the concrete is complete, as such known foamed concretes will typically have regions of lower density and low strength.

The process for preparing a foaming agent of the invention comprises the steps of:
  reacting a protein with a base to form a mixture; and
  adding an acid to the mixture.

The protein and/or base may be in solution with a solvent, but this is not essential. The protein may be one or more of the proteins discussed above. Often the protein will be blood, often ox blood. Whilst whole blood will typically be used, the blood may be treated prior to reaction with base, for instance the blood may have at least some of the plasma removed. The blood may be centrifuged, in general, the centrifuged blood will be substantially plasma free, by which is meant that plasma in the range 95-100% has been removed. Alternatively, the red blood cells may be removed from the whole blood and these alone treated to prepare a foaming agent.

Accordingly, the process for preparing a foaming agent may comprise the additional step of extracting protein from blood prior to reaction of the protein with a base. The extracted protein may be whole blood with plasma removed or red blood cells.

Where the protein is blood, the foaming agent will be a blood hydrolysate.

The base may be selected from the wide range of known bases, by which is meant Brønsted—Lowry bases, available. These include the carbonates, ammonia and the hydroxides which may be used alone or in combination with one another. Organic bases such as butyl lithium and lithium diisopropylamide may also be used alone, in combination with other organic bases and/or in combination with inorganic bases such as those listed above. Generally, the inorganic bases will be used due to their relatively inexpensive nature when compared to organic bases and their ease of storage. Of the inorganic bases, the hydroxides are generally used, in particular the alkali metal hydroxides such as sodium hydroxide for economic reasons and because these bases are strong bases. The typical concentration of base used to treat the protein source will be in the range 20-70% by volume, often 30-60% by volume, often 45-55% by volume. Where sodium hydroxide is used this will typically be a 50% sodium hydroxide solution, this may be further diluted prior to use.

The base may be added to the protein in an amount in the range 0.5-10% by volume of the mixture, often in the range 1-5% by volume, generally in amounts as low as 2-3% by volume. This amount of base has been found to be sufficient to modify the properties of the protein so that a substantially stable foam will be provided.

Without being bound by theory it is generally believed that the base attacks the amide bonds of the protein, breaking some or all of these bonds to provide a mixture containing short chain peptides and free amino acids. The base may further react with certain amino acid side chains present in the short chain peptides and free amino acids.

The acid is often present primarily to neutralise the basic mixture (i.e. to bring the pH back to about 7, at least in the range 6-8). Accordingly, the amount of acid used is generally that sufficient to neutralise the mixture of base treated protein. This will typically be in the range 0.5-10% by volume of the mixture, often in the range 1-5% by volume, generally in amounts as low as 2-3% by volume.

The acid may be any known acid, although acids with a pH of 1 or less, in particular strong acids (i.e. acids which completely ionise in aqueous solution), are generally used as a smaller volume of acid is required to effect neutralisation. Alternatively, it can be beneficial to use "weak" acids, where these are used, in concentrated form. By "concentrated" it is meant the acid in pure form, without any added solvent. The use of concentrated acids also reduces the volume of acid required to neutralise the base treated protein solution. Where a strong acid is used, this will typically be of concentration in the range 20-99% by volume, often 30-70% by volume, often 35-45% by volume.

Typical acids include acetic acid, hydrochloric acid, nitric acid, sulfuric acid, phosphoric acid, perchloric acid, sulphurous acid, nitrous acid, hypochlorous acid, chloric acid, chlorous acid, sulfonic acids and citric acid. The acid may be selected from the acids above either alone or in combination with other acids from the list, or acids which have not been exemplified. The acid is most commonly selected from sulphuric, hydrochloric and acetic acid. In many examples the acid will be hydrochloric acid.

In many cases the protein and/or base will be in solution, more often the base will be added to a protein-containing solution, the solution may be aqueous, or an alternative solvent may be used. Where the solvent is not water it will often be a hydrophilic solvent such as an alcohol (possibly ethanol).

Often, the protein contains an anticoagulant. This may be added, for instance, where blood is used. The anticoagulant may be any known anticoagulant including Fibrisol, warfarin, acenocoumarol, phenprocoumon, brodifacoum, phenindion, heparin, EDTA, sodium citrate and/or sodium oxalate. Typically, the anticoagulant will be Fibrisol, Fibrisol is a blend of sodium phosphates (30.2 wt %±0.5 wt %) and sodium chloride (qs) in the form of a free flowing, white, granular powder. Fibrisol is typically used in aqueous solution, most often as a 10% by volume aqueous solution. Often the anticoagulant will be added in a solvent in an amount in the range 5-20% by volume, often 7-10% by volume. In many instances the anticoagulant will be added in the ratio 10:100 parts of anticoagulant to solvent. In most cases the solvent will be water.

The step of reacting the protein with the base and/or the step of adding acid to the mixture may occur at a temperature in the range 50-130° C.; often in the range 80-125° C., sometimes in the range 95-115° C. or in the range 95-100° C. Often one or both of these steps (most often both) will occur at or near to the boiling point of the mixture; it will generally be the case that the temperature will be sufficient to ensure that the mixture is simmering. When reference is made to a mixture "near" to its boiling point, it is intended to be interpreted as simmering or boiling.

In many instances, the protein and base may be heated for one or more hours; often heating will be for a period in the range 30 minutes-5 hours, sometimes 1-4 hours, and often 2-3.5 hours. The resulting mixture may then be cooled (in some cases to ambient temperature), or the acid may be added without cooling. After addition of the acid, the mixture may be heated for a further period in the range 30 minutes-5 hours, sometimes 1-4 hours, and often 2-3.5 hours, if appropriate.

In many instances, the foaming agent will be stabilised. The addition of a stabiliser may be at any stage of the process for preparing the foaming agent; however, where a stabiliser is added this will often be after the addition of acid to neutralise the mixture. Addition to a neutral mixture prevents breakdown of the stabiliser by the base. After addition of the stabiliser, the mixture may be heated. Heating may be at a temperature in the range 50-130° C.; often in the range 80-125° C., sometimes in the range 95-115° C. Often heating of the stabilised mixture will occur at or near to the boiling point of the mixture; it will generally be the case that the temperature will be sufficient to ensure that the mixture is simmering.

The stabilised mixture, where heated, may be heated for a few minutes only, or for one or more hours. Often heating will occur for a time in the range 10-60 minutes, often 20-45 minutes, often 25-35 minutes. In many instances, where the mixture has been heated it will be allowed to cool (often to ambient temperature) before further processing.

The stabiliser may be an antioxidant, where antioxidants are used these may be selected from ferrous sulphate, butylphenols such as 2,4-dimethyl-6-tert-butylphenol, 2,6-di-tert-butylphenol, N,N'-di-2-butyl-1,4-phenylenediamine and combinations thereof. Ferrous sulphate is often used, typically in hydrated form.

In general, the stabiliser will be used as a dilute solution of the stabilising component, a range of solvents may be used although it is advantageous if the solvent selected is miscible with the solution to which it is added. Most often the solvent will be water and the stabiliser present in the range 0.5-10% by volume of the stabiliser solution, often 1-5% by volume, often 2-3% by volume. The use of stabiliser at this level is generally sufficient for the stabiliser to perform its function, without expending unnecessary raw material to provide a stable solution.

Optionally, one or more steps of the process for preparing a foaming agent may be carried out at a pressure above atmospheric. For instance, the process may be carried out in a pressure vessel. Where the process is applied at a pressure above atmospheric pressure, reference to boiling and simmering solutions will be modified to relate to the elevated temperature at which solutions simmer and boil when at elevated pressure. For instance, it is known that at a pressure of approximately 200 kPa, water boils at a temperature of approximately 125° C. The pressure of the reaction may therefore be in the range 101 kPa-250 kPa, often in the range 150-220 kPa, sometimes in the range 180 or 190-220 kPa. The higher the pressure, the more quickly the reaction will proceed. As such, preparing the foaming agent at elevated pressure may be advantageous in some examples.

Although not essential, the process for preparing a foaming agent will often include the additional step of removing solvent where this is present to concentrate the mixture. This step may be after stabilisation, or where a stabiliser is not used after neutralisation of the mixture with acid. Where concentration is not used, the foaming agent could be regarded as a ready-mix foaming agent solution as described above; however, the inclusion of a concentration step is preferred to reduce the volume of the foaming agent improving the effectiveness per unit volume of foaming agent and facilitating easy storage and transportation of the product.

Concentration of the foaming agent will typically be at atmospheric pressure and will remove at least some of the solvent. Often concentration will be simple boiling of the mixture allowing solvent to vent to the atmosphere, this may be in a closed or open container. Where the solvent is water, steam will typically be allowed to vent to the atmosphere.

In many cases the volume of the foaming agent product will be reduced by an amount in the range 10-80%, often 20-70%, most typically in the range 40-60%, a 50% reduction (reduction to half the original volume) being considered desirable. This reduction in volume may require heating (often to a temperature at or near the boiling point of the mixture) for one or more hours, often for 3 or more hours, often for a time in the range 3-8 hours, generally 3-6 hours, and often 4-5 hours.

As noted above, there is also provided a process for preparing a cement material, which process comprises the steps of:
- combining a foaming agent with a solvent to provide a foaming agent solution, wherein the foaming agent is obtainable by reaction of a protein with a base;
- foaming the foaming agent solution;
- adding the foaming agent solution to a solid material with mixing.

As noted above, the solvent will typically be water, in many examples the foaming agent solution consists essentially of foaming agent and water. It will often be the case that the foaming agent solution comprises foaming agent in the range 5-30% by volume of the foaming agent solution, often in the range 10-14% by volume. Levels in this range are sufficient to ensure that the cement material or concrete replacement to which the foaming agent is added will set before the foam containing the foaming agent deteriorates. It will generally be the case that the foaming agent solution comprises foaming agent in the range 20-25% by volume. The ratio of foaming agent to water of approximately 4.05:1 parts by volume has been found to work particularly well in balancing the amount of the foaming agent required with the stability of the foam produced. The foam produced at this ratio has been found to be stiff and to remain intact for a period of several hours without breaking down.

Foaming of the foaming agent will typically be using a foaming gun through which the foaming agent solution is pumped; however other methods of foaming may also be used. A variety of gases may be used to generate the foam, these may include gases selected from oxygen, nitrogen, carbon dioxide, argon or mixtures thereof. Typically, however, the gas will be air.

The rate of delivery of the foaming agent solution to the cement material mixture can, in some cases, have an effect upon the density of the cement material or concrete replacement produced. Specifically, it has been observed that the more quickly the foaming agent solution is added to the cement material, the lower the density of the resulting cement material or concrete replacement product will be. Without being bound by theory it is believed that the rapid addition of the foaming agent creates a greater degree of turbidity than would be observed with a slower addition. This turbidity may act to generate more foam, resulting in a product of lower density than if the turbidity had not been created. Accordingly, in some instances it may be beneficial to add the foaming agent solution at a rate in the range 0.25 L/minute-3 L/minute; where mixing is at a rate in the range 10-12 Kgs/minute the foaming agent solution may be added at a rate in the range 0.8-2 L/minute, often in the range 1.5-2 L/minute. The use of such ranges often provides a cement material or concrete replacement with a density of less than 1000 Kg/M$^3$. Where a higher density of concrete replacement product or cement material is required, the foaming agent solution may be added at a rate in the range 0.0005-0.8 L/minute. Where mixing is at a rate in the range 10-12 Kgs/minute the foaming agent solution may be added at a rate in the range 0.001-0.6 L/minute, often in the range 0.01-0.25 L/minute. The use of such ranges often provides a cement material or concrete replacement with a density of greater than 1000 Kg/M$^3$.

Where a concrete replacement is to be produced, this is generally achieved by including a granular material in the solid material included in the cement material described above. The granular material may be any granular material known to the person skilled in the art, as the nature of the granular material is not critical to the invention. Often the granular material will be a fine aggregate, in some instances the fine aggregate will comprise sand, sharp sand is often used. It will often be the case that the only granular material will be sand as this provides a fine particulate concrete replacement which is easy to manipulate and provides a smooth surface upon setting. Further, sand is often less expensive than other aggregates, and hence the use of sand offers cost benefits.

The cement material or concrete replacement of the invention may be made using the processes described in GB 2 330 086, the subject matter of which is incorporated herein by reference in its entirety. Where there is no granular material, or the only granular material is sand, the use of the processes described in GB 2 330 086 are particularly desirable.

In some examples where the granular material is sand, it will not be the only granular material and/or aggregate present, sand may be used as a major or minor component with one or more alternative materials. The secondary component may be other granular materials, fine aggregates or heavy aggregates. Typically, sand will be present in a higher percentage by weight than any other granular material or aggregate. Often where a second minor component is present it will be present in the range 0-5 wt %, often 0-1 wt %. In many examples the granular material will be present alone, often the granular material consists essentially of sand.

The cement materials and concrete replacements of the invention are useful in a wide range of common and specialist construction applications. The low density and high strength of the cement material or concrete replacement permit its use in the absence of reinforcing steel bars and hence allow the use of the cement material or concrete replacement in heavy construction and civil engineering applications. Further, the presence of the air-filled pores in the cement material or concrete replacement provide a product which is highly thermally insulating, allowing application in, for instance, house building applications where the prevention of heat loss to the environment is becoming an ever more important consideration.

The use of the cement material and concrete replacement products of the invention could dramatically reduce the carbon footprint of the construction industry. For instance, where used as substitutes for concrete in building construction the insulating properties of the inventive products allow the occupier of the building to use less energy heating their surroundings. Further, as a higher proportion of this product is water and little or no "heavy" aggregates are used, the carbon footprint (and cost) of transporting the raw materials from their source, to the depot and onward to the construction site is significantly reduced because the amount of materials which must be transported for use in the invention may have, on average, only 55% of the weight of the materials required to prepare the same structure using traditional materials, such as concrete. An additional benefit is that, as less materials are being used, the energy required to physically prepare the inventive product for use at the construction site is less than using traditional materials, as less energy is used the carbon footprint of the construction process itself will be lower than has previously been the case, providing long term benefits to the environment.

Unless otherwise stated each of the integers described in the invention may be used in combination with any other integer as would be understood by the person skilled in the art. Further, unless otherwise stated all percentages appearing in the specification are percentages by volume of the composition being described. In addition, although all aspects of the invention preferably "comprise" the features described in relation to that aspect, it is specifically envisaged that they may "consist" or "consist essentially" of those features outlined in the claims.

In order that the present invention may be more readily understood, it will be described further with reference to the specific examples hereinafter.

BRIEF DESCRIPTION OF DRAWINGS

The invention will now be described, by way of example only, by reference to the accompanying figures, of which.

DESCRIPTION OF EMBODIMENTS

Example 1

Preparation of a Foaming Agent

A foaming agent was prepared from anticoagulated ox blood. The anticoagulant was Fibrisol™ formed as an aqueous solution of 10 parts Fibrisol™ to 100 parts water. The anticoagulant was added to the ox blood with stirring.

The anticoagulated ox blood was placed in a 40 liter pressure vessel with a 2.5% by volume of the mixture of a 50% aqueous sodium hydroxide solution. The blood and sodium hydroxide solution was then boiled under a pressure of 103 kPa for 3 hours. The pressure was released and the solution allowed to cool naturally to room temperature.

The blood and sodium hydroxide solution was then neutralised using 2.5% by volume of the mixture of a 40% aqueous hydrochloric acid solution, the blood, sodium hydroxide and hydrochloric acid were boiled under pressure for a further 3 hours. The pressure was released and the resulting solution allowed to cool naturally to room temperature.

The solution was stabilised using a 2.5% by volume aqueous solution of ferrous sulfate (Iron (II) sulfate), the stabilised solution was heated under pressure for 30 minutes and then allowed to cool naturally to room temperature.

Finally, the foaming agent (i.e. the product of the previous processing steps) was concentrated by boiling in an open vessel to remove water until the volume had reduced to 50% of the volume prior to the commencement of the concentration step. This required boiling for 4-5 hours.

Example 2

Preparation of a Concrete Replacement Product

The foaming agent of Example 1 was used to prepare a concrete replacement using the apparatus of the specific embodiment of GB 2 330 086. A 4.04:1 water to foaming agent solution was foamed and mixed with sharp sand (30 wt % water) and 100% Portland cement (OPC). The apparatus was operated at a speed of 10.04 Kg/minute of sand and cement. The product density was optimised as shown in Example 3, a concrete replacement product of density 1810 Kg/M$^3$ was obtained by feeding the water and foaming agent to the foaming inlet using a water flow rate of 3.49 L/minute and a foaming agent flow rate of 0.00318 L/minute (a foaming agent solution flow rate of 0.00967 L/minute and a percentage foaming agent of 24.72 wt %). The flow rate of the foam into the mixing chamber was optimised to 0.2 L/minute in order to obtain a concrete replacement of density 1810 Kg/M$^3$.

Example 3

Optimisation of Foaming Agent Solution and Water Flow Rate

The density of the concrete replacements produced using the process of Example 1 was analysed. Altering the flow rates for the water and foaming agent used to form the foaming agent solution, and of the resulting foam (the foamed foaming agent solution) was found to provide products of different densities, as shown in Table 1 below.

Water flow rate was adjusted to ensure that the total water level in the concrete replacement product includes the water present in the sharp sand. The water content of the concrete replacement product of this example is 35 wt %, the flow rate of water was adjusted for the amount of water present in the sand, from 3.5 L/minute (where the sand is dry) to the flow rates shown below.

TABLE 1

Flow Rate Settings of Water (for Foaming Agent Solution), Foaming Agent, Foaming Agent Solution and Foam; and Water of Mixing all by Density for Mixing at 10.04 kgs per Minute

| Density Kg/M$^2$ | Foam L/Min | Foaming Agent L/Min | Foaming Agent Solution L/Min | Mixing water flow L/Min |
|---|---|---|---|---|
| 2000 | 0.0159 | 0.00025 | 0.00077 | 3.5 |
| 1950 | 0.0609 | 0.00097 | 0.00294 | 3.5 |
| 1900 | 0.1082 | 0.00172 | 0.00523 | 3.49 |
| 1850 | 0.1581 | 0.00251 | 0.00764 | 3.49 |
| 1810 | 0.2000 | 0.00318 | 0.00967 | 3.49 |
| 1800 | 0.2108 | 0.00335 | 0.01019 | 3.49 |
| 1790 | 0.2216 | 0.00352 | 0.01072 | 3.49 |
| 1750 | 0.2664 | 0.00423 | 0.01288 | 3.49 |
| 1710 | 0.3133 | 0.00497 | 0.01515 | 3.48 |
| 1700 | 0.3254 | 0.00517 | 0.01573 | 3.48 |
| 1690 | 0.3376 | 0.00536 | 0.01632 | 3.48 |
| 1650 | 0.3879 | 0.00616 | 0.01875 | 3.48 |
| 1640 | 0.4008 | 0.00636 | 0.01938 | 3.48 |
| 1600 | 0.4543 | 0.00721 | 0.02196 | 3.48 |
| 1550 | 0.5250 | 0.00834 | 0.02538 | 3.47 |
| 1500 | 0.6004 | 0.00953 | 0.02903 | 3.47 |
| 1450 | 0.6810 | 0.01081 | 0.03293 | 3.47 |
| 1400 | 0.7674 | 0.01218 | 0.03710 | 3.46 |
| 1350 | 0.8602 | 0.01366 | 0.04159 | 3.46 |
| 1300 | 0.9601 | 0.01524 | 0.04642 | 3.45 |
| 1250 | 1.0680 | 0.01696 | 0.05164 | 3.45 |
| 1200 | 1.1849 | 0.01881 | 0.05729 | 3.44 |
| 1150 | 1.3119 | 0.02083 | 0.06343 | 3.44 |
| 1100 | 1.4506 | 0.02303 | 0.07013 | 3.43 |
| 1050 | 1.6024 | 0.02544 | 0.07747 | 3.42 |
| 1000 | 1.7694 | 0.02809 | 0.08555 | 3.41 |
| 950 | 1.9539 | 0.03102 | 0.09447 | 3.41 |
| 930 | 2.0333 | 0.03228 | 0.09831 | 3.4 |
| 900 | 2.1590 | 0.03428 | 0.10439 | 3.4 |
| 850 | 2.3882 | 0.03792 | 0.11547 | 3.38 |
| 800 | 2.6461 | 0.04201 | 0.12794 | 3.37 |
| 750 | 2.9383 | 0.04665 | 0.14207 | 3.36 |
| 700 | 3.2723 | 0.05195 | 0.15821 | 3.34 |
| 650 | 3.6577 | 0.05807 | 0.17685 | 3.32 |
| 600 | 4.1073 | 0.06521 | 0.19858 | 3.3 |

TABLE 1-continued

Flow Rate Settings of Water (for Foaming Agent Solution), Foaming
Agent, Foaming Agent Solution and Foam; and Water of Mixing all
by Density for Mixing at 10.04 kgs per Minute

| Density Kg/M² | Foam L/Min | Foaming Agent L/Min | Foaming Agent Solution L/Min | Mixing water flow L/Min |
|---|---|---|---|---|
| 550 | 4.6386 | 0.07365 | 0.22427 | 3.28 |
| 500 | 5.2762 | 0.08377 | 0.25510 | 3.24 |
| 480 | 5.5685 | 0.08841 | 0.26923 | 3.23 |
| 450 | 6.0555 | 0.09614 | 0.29278 | 3.21 |

Figure 1:
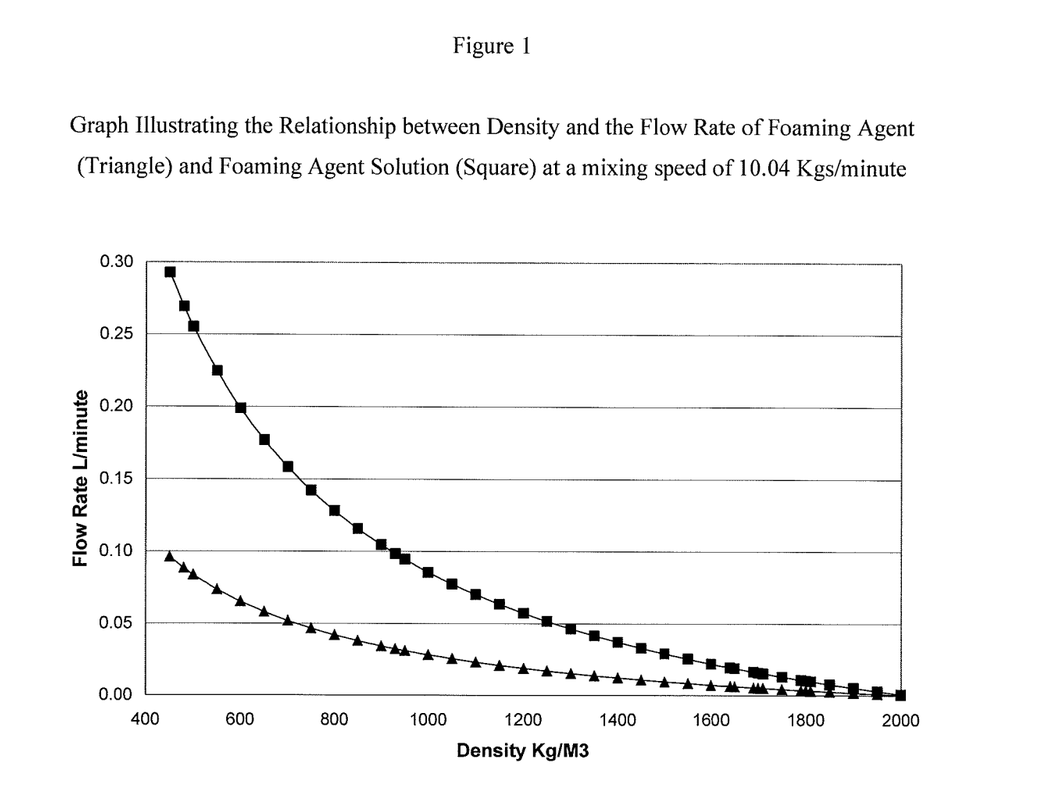
FIG. 1 is a line graph illustrating the relationship between the density of the concrete replacement product and the flow rate of foaming agent (triangle) and foaming agent solution (square) at a mixing speed of 10.04 kgs/minute.
Figure 2:
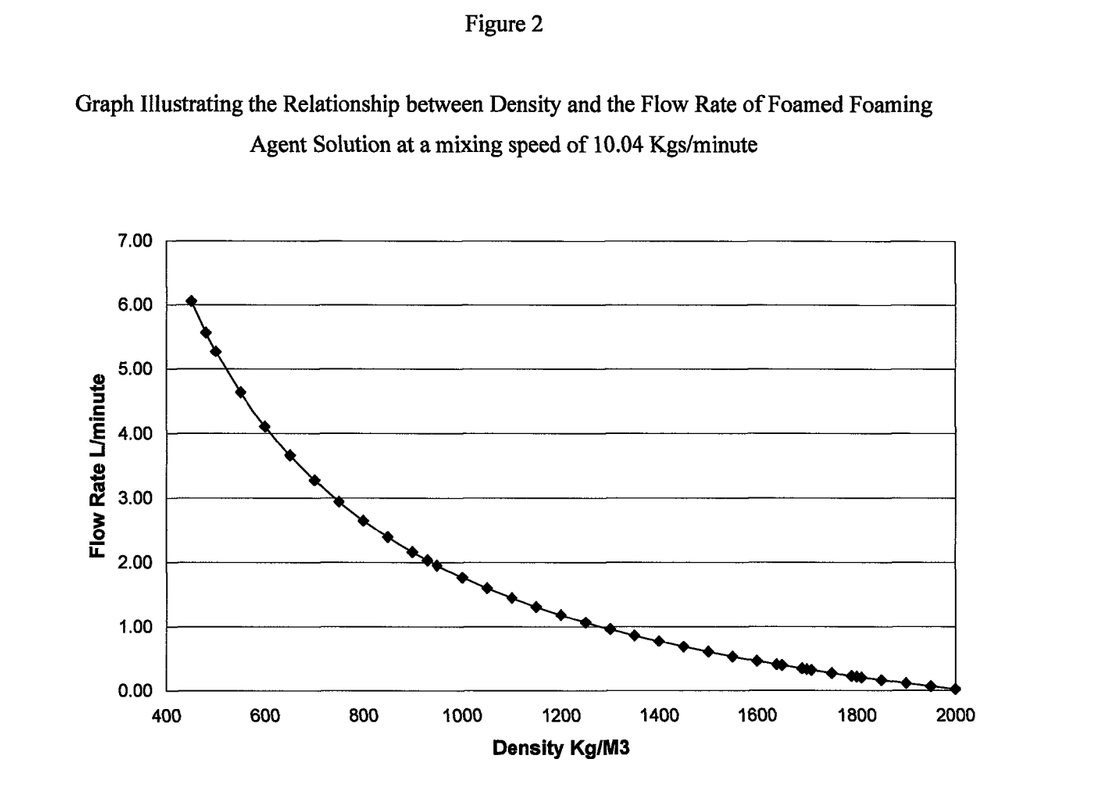
FIG. 2 is a graph illustrating the relationship between the density of the concrete replacement product and the flow rate of foamed foaming agent solution at a mixing speed of 10.04 kgs/minute.
Figure 3:
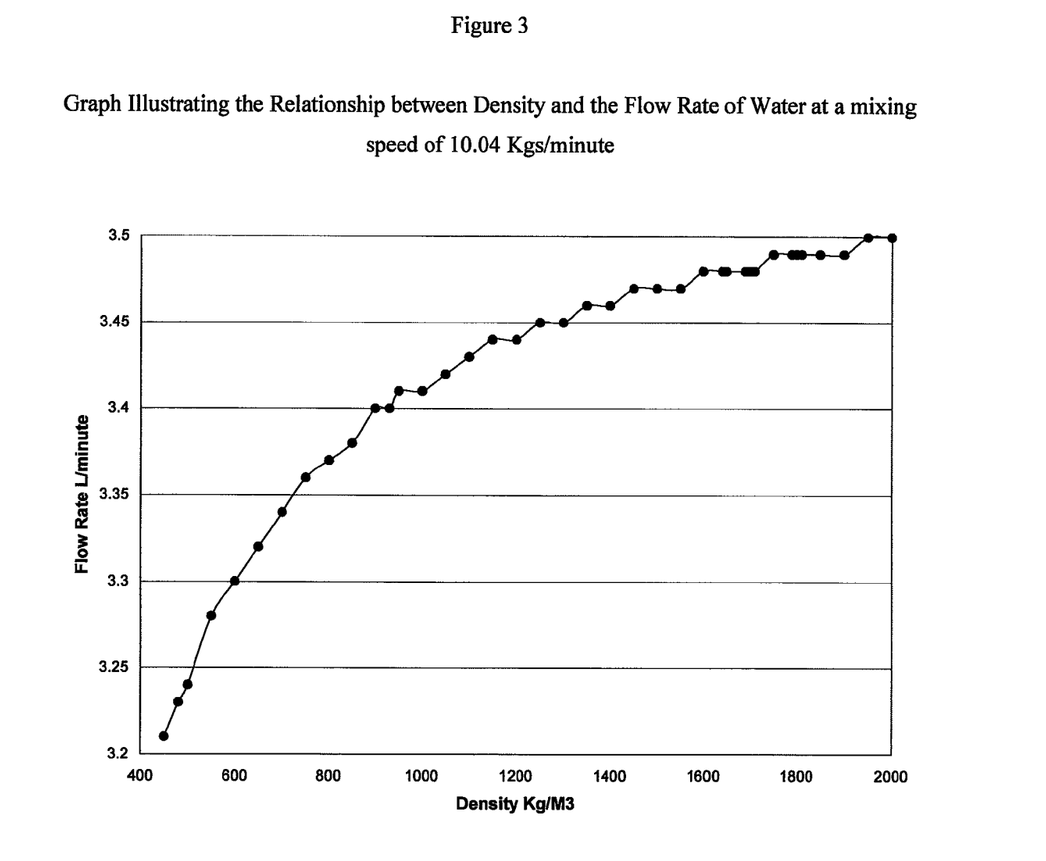
FIG. 3 is a graph illustrating the relationship between the density of the concrete replacement product and the flow rate of water at a mixing speed of 10.04 kgs/minute.
Figure 4:
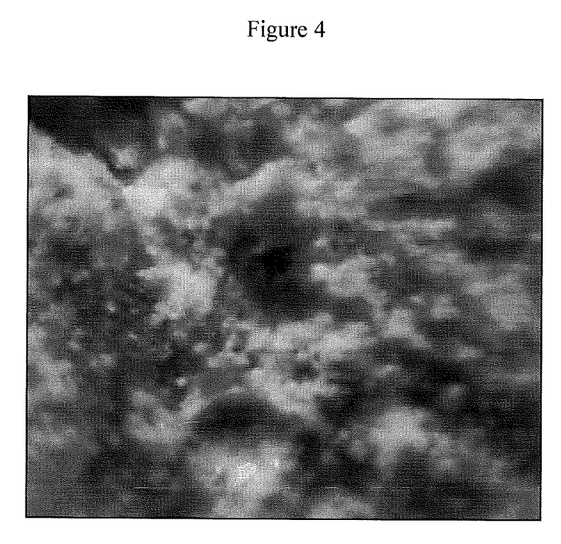
FIGS. 4 to 7 are microscope images of the cement material at 40× magnification.
Figure 5:
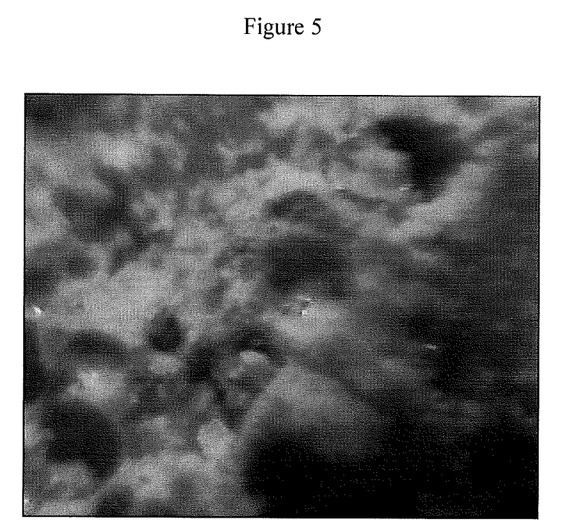
Figure 6:
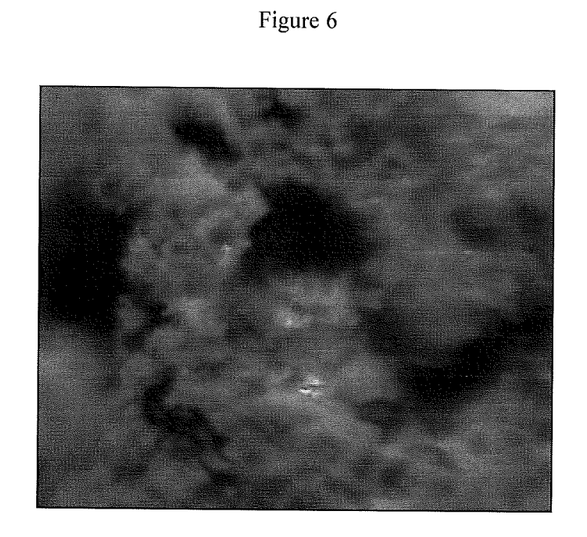
Figure 7:
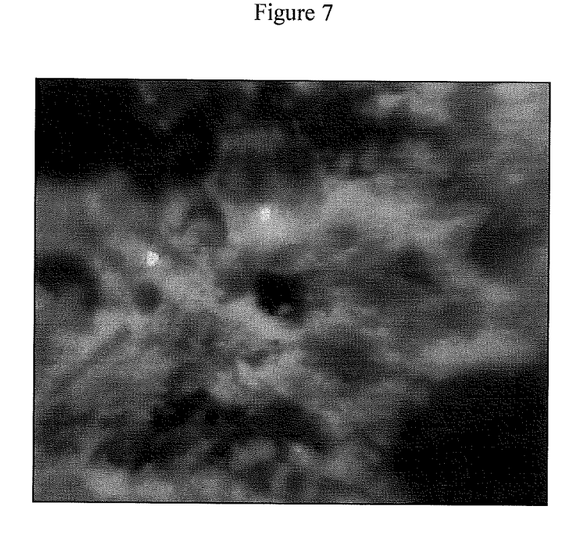

FIG. 1 shows the relationship between the flow rates of the foaming agent which form the foaming agent solution. FIG. 2 shows the relationship between the flow rate of the foaming solution once foamed and FIG. 3 shows the relationship between the density of the concrete replacement product and the water flow.

Example 4

Comparison of Performance to Strength Ratios

The strength-to-weight ratio was determined for the concrete replacement product of Example 3 at four densities. This was compared to strength-to-weight ratios derived from literature densities and strengths of commercially available concretes. The values are provided below:

| Example 3 | | | Concrete | | |
|---|---|---|---|---|---|
| Density (Kg/M³) | Strength (N/mm²) | % Strength to Weight | Density (Kg/M³) | Strength (N/mm²) | % Strength to Weight |
| 1810 | 32 | 1.77 | 3060 | 37 | 1.21 |
| 1805 | 23 | 1.28 | 2500 | 35 | 1.40 |
| 1752 | 27 | 1.54 | 2440 | 32 | 1.31 |
| 1660 | 17 | 1.02 | 2250 | 30 | 1.33 |
| — | — | — | 2200 | 25 | 1.13 |
| — | — | — | 2000 | 10.4 | 0.52 |

The average strength-to-weight ratio of the concrete of Example 3 was 1.40%, the average for the known concretes was 1.15%. As can be seen the performance of the inventive concrete replacements is generally superior to that of known concretes.

Example 5

Fine Structure of the Cement Material

FIGS. 4 to 7 show the fine structure of the cement material as including macropores and micropores in combination.

The invention claimed is:

1. A composition comprising a cement material and a foamed agent solution; the foamed agent solution comprising about 10-30% by volume of a liquid blood hydrolysate and one or more solvents, wherein the liquid blood hydrolysate further comprises an anticoagulant.

2. A composition according to claim 1, wherein the cement material is selected from the group consisting of Portland cement, Portland cement blends, lime cements, and super-sulfated cements.

3. A composition comprising a cement material according to claim 2, further comprising water in the range 10-40 wt %; and wherein the composition is operable to be utilized as a concrete replacement product.

4. A composition according to claim 2, further comprising an aggregate or granular material.

5. A composition according to claim 4, wherein the aggregate or granular material is selected from the group consisting of sand, pumice, gravel, fibers, and perlite.

6. A composition according to claim 2, further comprising about 0-1 wt % of one or more products selected from the group consisting of a granular material other than sand, a fine aggregate, and a heavy aggregate.

7. The composition of claim 2, having a density in the range of about 450-2100 Kg/M³.

8. A composition of claim 2, further comprising pores of mean diameter in the range of about 25-250 μm.

9. A composition comprising a cement material and a foamed agent solution; the foamed agent solution consisting of about 10-30% by volume of a liquid blood hydrolysate and one or more solvents, wherein the liquid blood hydrolysate further comprises an anticoagulant.

10. The composition of claim 9, wherein having pores of mean diameter in the range of 25-250 μm.

* * * * *